Jan. 23, 1940.   H. L. DONNELL   2,188,109
ANIMAL TRAP
Filed Dec. 30, 1938   2 Sheets-Sheet 1
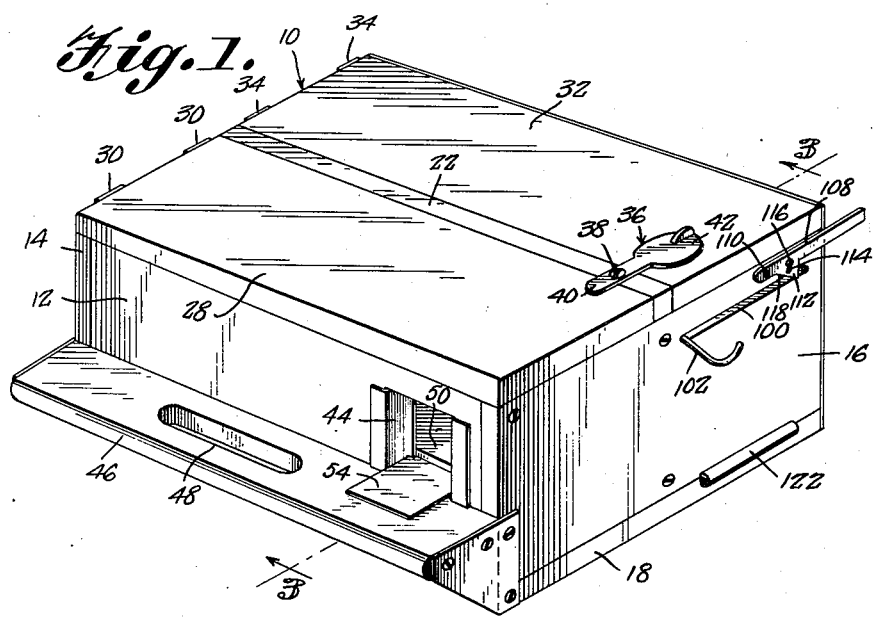
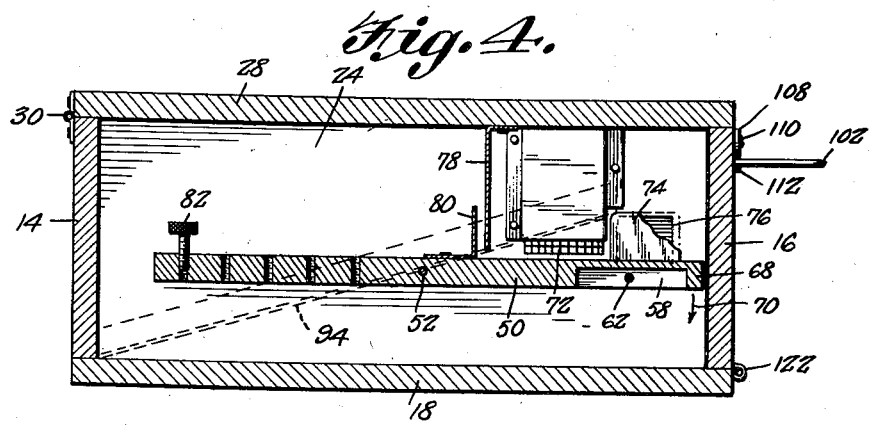
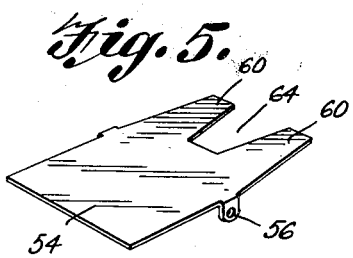
Hugh L. Donnell,
INVENTOR
WITNESS
BY Victor J. Evans & Co.
ATTORNEYS Jan. 23, 1940.  H. L. DONNELL  2,188,109
ANIMAL TRAP
Filed Dec. 30, 1938  2 Sheets-Sheet 2

Hugh L. Donnell,
INVENTOR

BY Victor J. Evans & Co.
ATTORNEYS

WITNESS

Patented Jan. 23, 1940

2,188,109

UNITED STATES PATENT OFFICE 2,188,109

ANIMAL TRAP

Hugh L. Donnell, Auburntown, Tenn.

Application December 30, 1938, Serial No. 248,586

6 Claims. (Cl. 43—67)

My invention relates to the destruction of rodents, and has among its objects and advantages the provision of an improved animal trap.

An object of my invention is to provide a trap particularly adapted for catching mice in which the device embodies an entrance chamber provided with a normally opened door wherein novel means are incorporated for automatically closing the entrance door as the animal enters the chamber so as to prevent its escape therefrom. The device embodies a trap chamber or cage provided with communication with the entrance chamber. Thus the animal may pass from the entrance chamber to the cage chamber through a passage, the latter being provided with a platform which, under the weight of the animal, will give way and drop the animal into the cage. The platform is so constructed as to return to its normal position to function as a door, thus preventing the animal from returning to the passage. In addition, the cage of the trap is provided with novel means for encouraging the trapped animal to take a predetermined position in combination with a striker which may be manually released for striking the animal in said predetermined position and killing the same.

In the accompanying drawings:

Figure 1 is a perspective view of a trap embodying my invention;

Figure 4 is a sectional view along the line 4—4 of Figure 2; and

Figure 5 is a perspective view of the treadle and closing door for the entrance opening.

Figure 2:
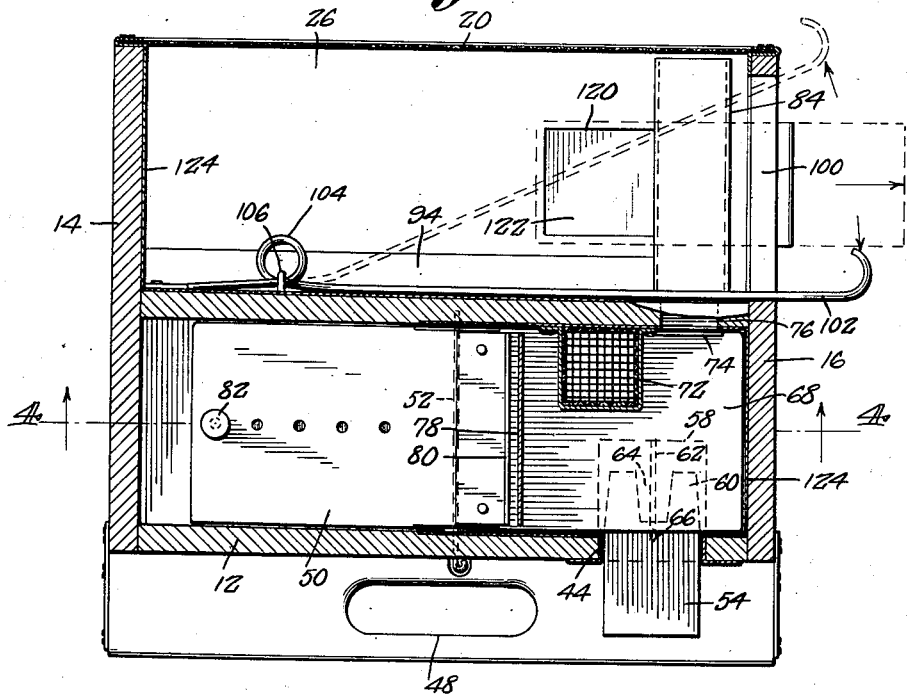
Figure 2 is a plan view with the top removed.

In the embodiment selected to illustrate my invention, the trap comprises a box 10 which includes a front wall 12, side walls 14 and 16 and a bottom 18. These parts may be connected into a unitary assembly by nailing. The rear of the box is opened and is covered by a screen or suitable mesh 20. Inside the box I mount a partition 22 to provide an entrance chamber 24 and a cage chamber 26. A cover 28 is hinged at 30 to the wall 14 for covering the entrance chamber 24, while a cover 32 is hinged at 34 to the wall 14. The upper edge of the partition 22 terminates flush with the upper faces of the covers 28 and 32.

To the upper edge of the partition 22 I mount a latch 36 through the medium of a screw 38 threaded into the partition. Latch 36 includes a narrow reach 40 which may be positioned transversely of the partition 22 for latching the covers 28 and 32 in their closed positions. However, the narrow reach 40 may be pivoted to a position paralleling the partition 22, with the disc part 42 of the latch positioned beyond the end of the box, for unlatching the covers.

Wall 12 is provided with an entrance 44, the bottom of which terminates flush with a grip 46 which functions as a platform for the animal to facilitate entrance into the chamber 24. Grip 46 is slotted at 48 for the reception of the carrier's fingers to facilitate handling.

Inside the chamber 24 I mount a platform 50 which is pivotally supported on a shaft 52 anchored in the wall 12 and the partition 22. Platform 50 is so balanced as to normally take the position of Figure 4. In the position of Figure 4, the platform 50 has its upper surface lying slightly above the bottom of the entrance opening 44. A trap door 54 is pivoted at 56 to the side walls of the entrance 44 and normally lies with its forward portion resting on the grip or platform 46. Platform 50 is recessed at 53 to accommodate the two extensions 60 of the trap door 54, and the platform 50 carries a wire 62 extending longitudinally of the slot 64 and has its upturned end 66 engaging the bottom side of the trap door 54 slightly inwardly of the pivotal axis 56.

Platform 50 is sensitively balanced so that its end 68 will pivot downwardly in the direction of the arrow 70 when stepped upon by the mouse. As the weight of the mouse pivots the platform 50 downwardly, the trap door 54 is pivoted to a vertical position for closing the entrance 44. The chamber 24 is provided with a wire receptacle 72 for bait for enticing the animal into the trap.

Platform 50 carries an upstanding flange 74 which closes the entrance 76 into the cage 26. With the platform 50 pivoted downwardly, flange 74 takes a position below the entrance 76 to permit the animal to enter therein. Depending from the cover 28 is a flange 78 which cooperates with a flange 80 attached to the platform to prevent the animal from passing beyond these two flanges. Platform 50 may be provided with a set screw 82 arranged to be shifted longitudinally thereof to secure proper balance of the platform.

Figure 3:
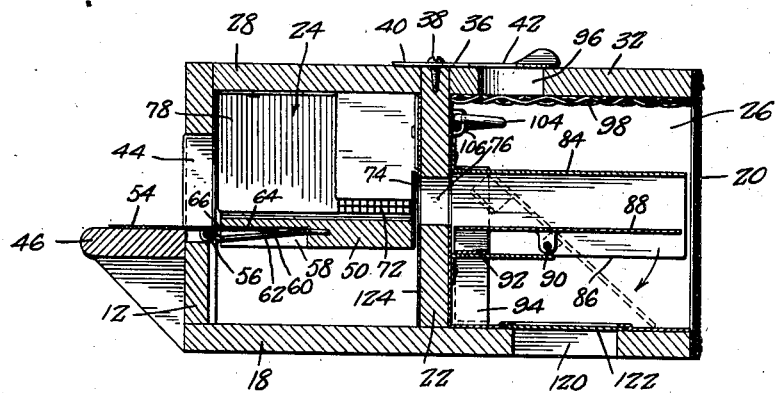
Figure 3 is a sectional view along the line 3—3 of Figure 1.

Inside the cage 26, and to the partition 22, I mount a horizontal passage 84 which extends the full width of the cage. The bottom of the passage 84 is open at 86, which opening is closed by a trap door 88 pivotally mounted at 90 to the side walls of the passage 84. Trap door 88 carries a stop 92 which loads the end of the trap door adjacent the partition 22 in a sufficient degree to normally support the trap door in the position of Figure 3. Stop 92 normally rests on the bottom of the passage 84.

I locate the trap door 88 substantially flush with the bottom of the entrance 76 so as to constitute a floor upon which the animal may walk into the passage 84. As the animal passes beyond the axis of the trap door, the trap door pivots downwardly and drops the animal into the cage 26. Trap door 88 then immediately resumes its normal position of Figure 3, which prevents the animal from entering the passage 84.

Inside the cage 26 I mount an incline runway 94 which leads from the bottom 18 adjacent the wall 14 to a position on top the passage 84 near the wall 16. Above the passage 84, and substantially above the upper end of the runway 94, I provide a light opening 96 in the cover 32. Disc 42 of the latch 36 normally covers the light opening 96, which light opening is also covered by a screen or mesh 98.

Wall 16 is provided with a horizontal slot 100 through which one end of a stiff spring wire 102 projects. Wire 102 is coiled at 104 and is anchored to the partition 22 by means of a suitable staple 106. The opposite end of the wire bears against the partition 22, as illustrated in Figure 2, which is also true of the long reach of the wire 102.

Upon the outer face of the wall 16 I mount a latch bar 108, which bar is pivotally connected at 110 with the wall. The bar includes a hook 112 arranged to have latching relation with the wire 102 when it is pulled back to the dotted line position of Figure 2. The bar is slotted at 114 for the reception of a pin 116 anchored to the wall 16. Pin 116 prevents the latch bar 108 from dropping beyond a predetermined position, and the hook 112 includes a cam edge 118 arranged in the path of the wire 102. Thus the wire 102 will cam the latch bar 108 upwardly as it is brought into camming relation with the edge 118, so that the wire may be moved to its retracted position beyond the hook and held thereby.

With a mouse in the cage 26, the latch 36 is moved for uncovering the light opening 96, at which time the animal will ascend the runway 94 in seeking an outlet through the light opening. As the animal takes a position underneath the light opening, the latch bar 108 is lifted for releasing the spring wire 102, which wire will strike the animal with sufficient force to cause instant death. The dead animal is then removed from the cage 26 through an opening 120 normally closed by a slide door 122.

The pivotal axis 56 for the trap door 54 is located in close relation to the adjacent edge of the platform 50. As the mouse enters the opening 44, the weight of the animal upon the trap door 54 will prevent any shifting thereof until the full weight of the animal is transmitted to the platform 50. The platform 50 will then drop suddenly for closing the entrance 44 and uncovering the entrance 76.

Entrance 44 will remain closed and the entrance 76 opened so long as any weight of the animal remains on the platform 50. As soon as the animal passes through the opening 76, the platform 50 will immediately and automatically fall to the normal position of Figure 4. Flange 74 will then cover the entrance 76 to trap the mouse inside the passage 84 to prevent its return to the chamber 24. The upturned end 66 of the wire 62 bears against the trap door 54 in the normal position of the platform 50, with the extensions 60 bearing against the platform so as to prevent the heavy end of the platform from moving the platform beyond the position of Figure 4. Both the entrance chamber 24 and the cage chamber are metal lined, as at 124.

Without further elaboration, the foregoing will so fully illustrate my invention that others may, by applying current knowledge, readily adapt the same for use under various conditions of service.

I claim:

1. An animal trap comprising an entrance chamber provided with an entrance opening and a cage chamber, said entrance chamber and cage chamber being provided with a communicating door opening, a pivoted platform inside the entrance chamber and provided with a door for normally closing said communicating door opening, a trap door for closing the entrance opening, and an operating connection between the trap door and the platform, said platform being pivoted by the weight of an animal thereon for moving said first door to an open position and moving the trap door to a closed position.

2. An animal trap comprising an entrance chamber provided with an entrance opening and a cage chamber, said entrance chamber and the cage chamber being provided with a communicating door opening, a pivoted platform inside the entrance chamber and provided with a door for normally closing said communicating door opening, a trap door for closing the entrance opening, an operating connection between the trap door and the platform, said platform being pivoted by the weight of an animal thereon for moving said first door to an open position and moving the trap door to a closed position, a passage having communication with said door opening having an open bottom, and a trap door located inside said passage for normally closing the open bottom thereof, said last trap door being pivotally mounted and movable by the weight of an animal thereon to a position for dropping the animal into the cage chamber.

3. An animal trap comprising an entrance chamber provided with an entrance opening and a cage chamber, said entrance chamber and the cage chamber being provided with a communicating door opening, a pivoted platform inside the entrance chamber and provided with a door for normally closing said communicating door opening, a trap door for closing the entrance opening, an operating connection between the trap door and the platform, said platform being pivoted by the weight of an animal thereon for moving said first door to an open position and moving the trap door to a closed position, a passage having communication with said door opening having an open bottom, a trap door located inside said passage for normally closing the open bottom thereof, said last trap door being pivotally mounted and movable by the weight of an animal thereon to a position for dropping the animal into the cage chamber, means inside the cage chamber for enticing the animal to a predetermined position therein, and striker means for killing the animal when in said predetermined position.

4. An animal trap comprising an entrance chamber provided with an entrance opening and a cage chamber, said entrance chamber and the cage chamber being provided with a communicating door opening, a pivoted platform inside the entrance chamber and provided with a door for normally closing said communicating door opening, a trap door for closing the entrance opening, an operating connection between the trap door and the platform, said platform being pivoted by the weight of an animal thereon for moving said first door to an open position and moving the trap door to a closed position, a passage having communication with said door opening having an open bottom, a trap door located inside said passage for normally closing the open bottom thereof, said last trap door being pivotally mounted and movable by the weight of an animal thereon to a position for dropping the animal into the cage chamber, means inside the cage chamber for enticing the animal to a predetermined position therein, striker means for killing the animal when in said predetermined position, said striker means comprising a spring wire, and manually actuated latch means for holding the spring wire in a retracted position and for releasing the same.

5. An animal trap comprising an entrance chamber provided with an entrance opening and a cage chamber, said entrance chamber and the cage chamber being provided with a communicating door opening, a pivoted platform inside the entrance chamber and provided with a door for normally closing said communicating door opening, a trap door for closing the entrance opening, an operating connection between the trap door and the platform, said platform being pivoted by the weight of an animal thereon for moving said first door to an open position and moving the trap door to a closed position, and a bait support inside said entrance chamber so located therein as to cause the animal to fully enter the chamber.

6. An animal trap comprising an entrance chamber provided with an entrance opening and a cage chamber, said entrance chamber and the cage chamber being provided with a communicating door opening, a pivoted platform inside the entrance chamber and provided with a door for normally closing said communicating door opening, a trap door for closing the entrance opening, and an operating connection between the trap door and the platform, said platform being pivoted by the weight of an animal thereon for moving said first door to an open position and moving the trap door to a closed position, said trap door normally extending through said entrance opening to receive some weight of the animal passing through the entrance opening, said trap door being so related to the platform as to prevent pivotal movement thereof until the animal has completely entered the entrance chamber.

HUGH L. DONNELL.